(12) United States Patent
Alfani et al.

(10) Patent No.: US 9,810,277 B2
(45) Date of Patent: Nov. 7, 2017

(54) FRICTION MATERIAL FOR BRAKE PADS AND RELATED BRAKE PADS

(71) Applicants: Italcementi S.p.A., Bergamo (IT); Freni Brembo S.p.A., Curno (IT)

(72) Inventors: Roberta Alfani, Bergamo (IT); Fabio Corazza, Gorle (IT); Flavio Rampinelli, Urgnano (IT); Andrea Bonfanti, Curno (IT); Paolo Varotto, Curno (IT); Laura Sammarelli, Curno (IT); Arianna Belotti, Curno (IT)

(73) Assignees: FRENI BREMBO S.P.A., Curno (BG) (IT); ITALCEMENTI S.P.A., Bergamo (IT)

(*) Notice: Subject to any disclaimer, the term of this patent is extended or adjusted under 35 U.S.C. 154(b) by 0 days.

(21) Appl. No.: 14/899,018

(22) PCT Filed: Jun. 16, 2014

(86) PCT No.: PCT/IB2014/062258
§ 371 (c)(1),
(2) Date: Dec. 16, 2015

(87) PCT Pub. No.: WO2014/203142
PCT Pub. Date: Dec. 24, 2014

(65) Prior Publication Data
US 2016/0131215 A1 May 12, 2016

(30) Foreign Application Priority Data
Jun. 17, 2013 (IT) .............................. MI2013A0998

(51) Int. Cl.
*F16D 69/02* (2006.01)
*C04B 28/04* (2006.01)
*C04B 111/00* (2006.01)

(52) U.S. Cl.
CPC ............ *F16D 69/028* (2013.01); *C04B 28/04* (2013.01); *F16D 69/027* (2013.01); *C04B 2111/00362* (2013.01)

(58) Field of Classification Search
CPC ..... C04B 28/04; C04B 14/024; C04B 14/307; C04B 14/34; C04B 14/368; C04B 14/48; C04B 16/0691; C04B 22/14; C04B 2111/00362; F16D 69/027; F16D 69/028
See application file for complete search history.

(56) References Cited

U.S. PATENT DOCUMENTS

| | | | |
|---|---|---|---|
| 1,967,224 A | 7/1934 | Collier et al. | |
| 2,110,571 A * | 3/1938 | Elerath | F16D 69/021 106/36 |
| 2,420,475 A * | 5/1947 | Greger | F16D 69/021 106/36 |
| 3,655,609 A * | 4/1972 | Evans | C08K 3/34 106/36 |
| 3,684,062 A * | 8/1972 | Johnson | F16D 65/08 188/251 A |
| 3,967,037 A * | 6/1976 | Marzocchi | F16D 69/026 188/215 |
| 4,482,385 A * | 11/1984 | Satkowski | C04B 14/34 106/643 |
| 4,780,141 A | 10/1988 | Double et al. | |
| 4,792,361 A * | 12/1988 | Double | F16D 69/028 106/36 |
| 5,250,588 A * | 10/1993 | Delvaux | F16D 69/022 523/153 |
| 5,433,774 A | 7/1995 | Kapl et al. | |
| 6,035,591 A | 3/2000 | Hicks et al. | |
| 6,451,105 B1 * | 9/2002 | Turpin, Jr. | C04B 28/04 106/738 |
| 8,079,538 B2 * | 12/2011 | Spellman | C04B 7/527 241/79 |

OTHER PUBLICATIONS

Gutierrez, Dominguez, "International Preliminary Report on Patentability for International Application No. PCT/IB2014/062258," European Patent Office, dated Sep. 10, 2015.
Gutierrez, Dominguez, "International Search Report and Written Opinion of the International Searching Authority for International Application No. PCT/IB2014/062258," European Patent Office, dated Oct. 9, 2014.
"National Cooperative Highway Research Program Appendix A-Standard Method of Test for Particle Size Analysis of Hydraulic Cement and Related Materials by Light Scattering, A-1 Measuring Cement Particle Size and Surface Area by Laser Diffraction Introduction", Apr. 30, 2013 (Apr. 30, 2013), XP055145401, Retrieved rom the Internet [retrieved on Oct. 9, 2014].
PCA: "Fly Ash, Slag, Silica Fume, and Natural Pozzolans", Dec. 2, 2002 (Dec. 2, 2002), XP055145409, Retrieved from the Internet [retrieved on Oct. 9, 2014].

* cited by examiner

*Primary Examiner* — Anthony J Green
(74) *Attorney, Agent, or Firm* — Florek & Endres PLLC

(57) ABSTRACT

A friction material is disclosed comprising a binding composition based on a hydraulic binder and its use in brake pads and industrial applications.

9 Claims, 2 Drawing Sheets

FRICTION MATERIAL FOR BRAKE PADS AND RELATED BRAKE PADS

FIELD OF THE INVENTION

The present invention relates to a friction material for brake pads and related brake pads.

BACKGROUND OF THE INVENTION

The present invention is comprised in the field of friction materials for brake pads, which, as well known, shall have a composition such as to ensure consistent and reliable performances in a wide range of operative conditions.

In particular, as the disc brake pads for vehicles operate under extreme and hard working conditions, having to satisfy at the same time reliability and a long life, the manufacturers have constantly tried to improve the features and performances of friction materials.

The brake pad is indeed formed of a support base, usually metallic, and of a friction layer composed of various materials. According to the properties and the composition of the friction material, it is possible to promote efficiency (namely the braking force) or the pad life.

In the state of the art the first friction materials for brake pads had a composition containing asbestos. However, also in this field, as soon as the dangerousness of asbestos made its use, at first discouraged, then forbidden, substitutive compounds have been sought.

Replacement materials have been therefore searched which could allow to achieve a product characterized by equal or improved performances with respect to those obtained through the friction material containing asbestos and have been thus developed, for example, friction materials containing steel and various types of metals in variable amounts (such as for example copper, aluminium, zinc, etc.) and comprising, as binding element, thermosetting resins such as phenolic resins as such, and or modified phenolic resins among which the silicon and epoxy acrylic resins.

These thermosetting resins are currently present in the friction materials for brake pads in a percentage of 8-20% by weight with respect to the total weight of the composition of the friction material and are necessary for allowing hot moulding of the braking mixture, ensuring excellent final performances of the brake pad, such as braking capability, resistance to wear and to abrasion, etc.

The use of thermosetting phenolic resins presents however some drawbacks, first of all a problem of environmental sustainability and potential toxicity. It deals, indeed, with resins which may release phenol, formaldehyde and derivatives from the thermo-oxidative degradation, both during processing, and during the use of the end-product. Pursuant to regulation EC 1272/2008, phenol is classified as toxic substance, harmful in case of protracted contact with the skin and mutagenic of class 3. Consequently the search for alternatives for reducing the emission of phenols in the environment is active in all fields.

As a consequence, such a problem occurred also in the field of friction materials: indeed, although each piece of friction materials releases only low quantities of phenols and formaldehyde, overall the quantity of phenols released can become significant, both due to the great number of vehicles on the roads and for the great number of industrial applications using said materials.

A purpose of the present invention is therefore that of identifying a friction material having a composition allowing to satisfy at the same time the required technical specifications, such as the thermo-mechanical ones, ensuring however a high environmental sustainability, overcoming thus the drawbacks of the friction materials containing phenolic resins according to the prior art.

A further purpose of the present invention is the use of such a friction material in brake pads and in further industrial applications.

SUMMARY OF THE INVENTION

Subject-matter of the present invention is therefore a friction material for brake pads comprising a binding composition based on a hydraulic binder selected among Portland cement, pozzolana cement or slag cement, said binder being provided with a blaine fineness comprised between 3500 and 9000, more preferably between 4000 and 7000 and still more preferably with a fineness equal to 6500 blaine.

A further subject-matter of the present invention are also brake pads composed of a friction material comprising a binding composition based on a hydraulic binder selected among Portland cement, pozzolana cement or slag cement, said binder being provided with a blaine fineness comprised between 3500 and 9000, more preferably between 4000 and 7000 and still more preferably with a fineness equal to 6500 blaine and a base of metallic support.

A subject-matter of the present invention are also the use of a binding composition based on a hydraulic binder selected among Portland cement, pozzolana cement or slag cement, said binder being provided with a blaine fineness comprised between 3500 and 9000, more preferably between 4000 and 7000 and still more preferably with a fineness equal to 6500 blaine for achieving friction materials and the use of said friction materials in brake pads and in further industrial applications.

DETAILED DESCRIPTION OF THE PREFERRED EMBODIMENTS

Figure 1:
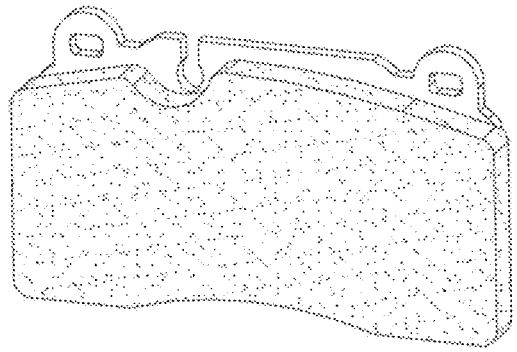
FIG. 1 is a schematic perspective view of an illustrative brake pad incorporating a friction material according to an embodiment of the present invention.
Figure 2A:
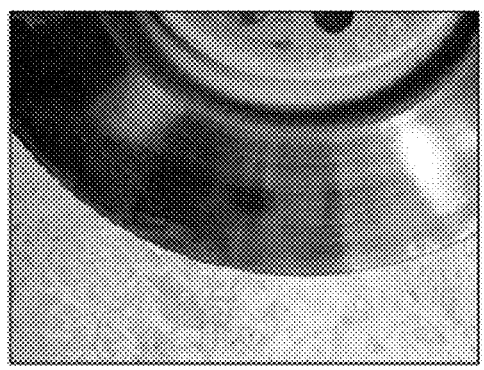
FIG. 2A is a photograph of a portion of a brake rotor surface after having been subjected to test AK Master and test AMS using a prior art brake pad with resin but without cement.
Figure 2B:
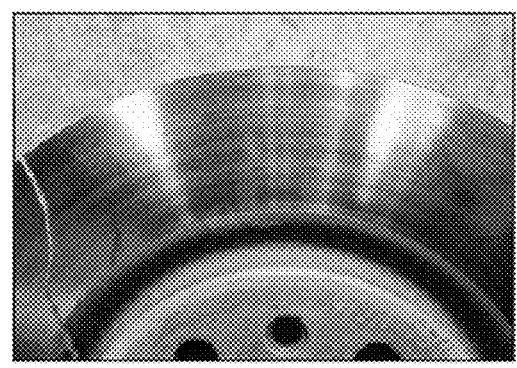
FIG. 2B is a photograph of another portion of the brake rotor surface of FIG. 2A after having been subjected to test AK Master and test AMS using a prior art brake pad with resin but without cement.
Figure 2C:
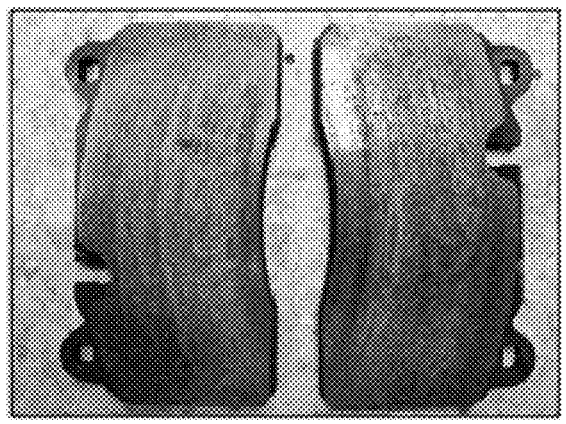
FIG. 2C is a photograph of the face of prior art brake pads with resin but without cement having been subjected to test AK Master and test AMS.
Figure 3A:
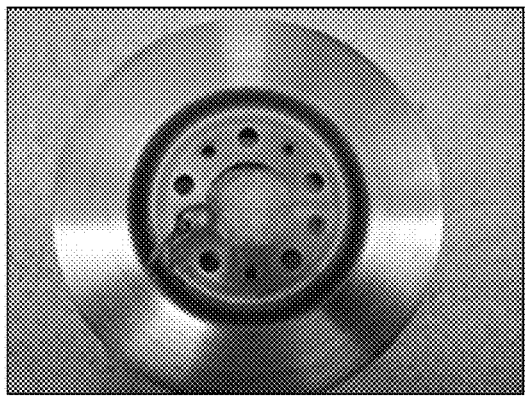
FIG. 3A is a photograph of a brake rotor surface after having been subjected to test AK Master and test AMS using a brake pad with resin and cement.
Figure 3B:
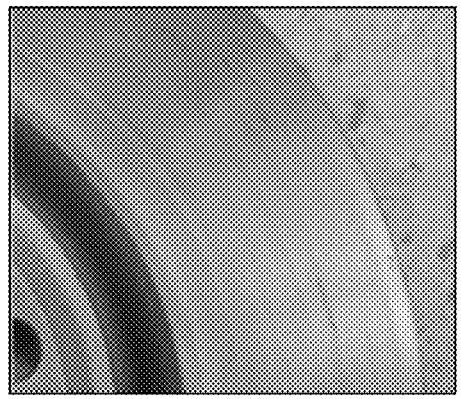
FIG. 3B is a photograph of a portion of the brake rotor surface of FIG. 3A after having been subjected to test AK Master and test AMS using a brake pad with resin and cement.
Figure 3C:
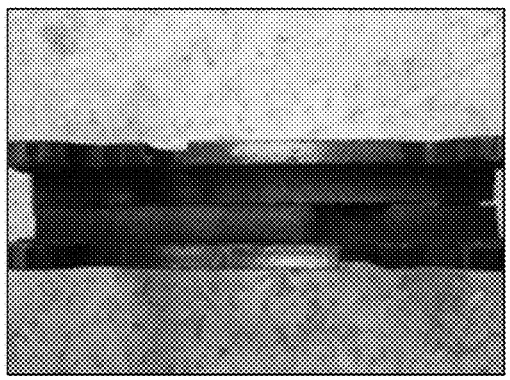
FIG. 3C is a photograph of the top of two facing brake pads with resin and cement having been subjected to test AK Master and test AMS.
Figure 3D:
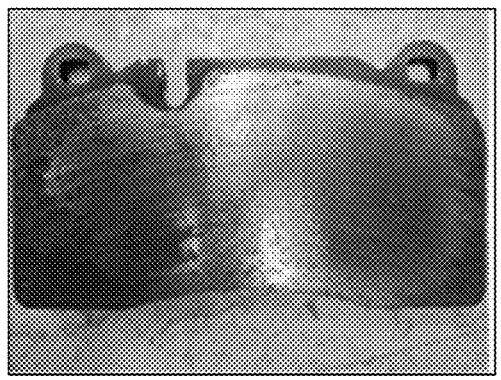
FIG. 3D is a photograph of the face of a brake pad with resin and cement having been subjected to test AK Master and test AMS.

The present invention therefore relates to friction materials which comprise a binding composition based on a hydraulic binder selected among Portland cement, pozzolana cement or slag cement, said binder being provided with a blaine fineness comprised between 3500 and 9000, more preferably between 4000 and 7000 and still more preferably with a fineness equal to 6500 blaine.

The binding composition based on a hydraulic binder present in the friction material according to the present invention replaces in full the thermosetting resin (currently present in a percentage of 8-20% by weight with respect to the total weight of the composition of the friction material for allowing hot moulding of the braking mixture), ensuring overall improved performances of the brake pad.

Indeed, braking capability, resistance to wear, to abrasion, etc. can be compared with the brake pads according to the state of the art, achieved through thermosetting resin binders.

The friction materials according to the present invention are therefore characterized by fully unexpected advantages, in that, although any type of thermosetting resin is used as binder, they provide equal performances in terms of friction, resistance to wear, life-lasting and other features with respect to a conventional product using materials based on thermosetting resins.

Therefore, a first advantage of friction materials according to the present invention can be identified in the absence of release of phenols in the environment; hence, they stand for materials of particular interest which, also with equal other thermo-mechanical features, overcome such a problem, with an environmental sustainability definitely improved.

Moreover, as the phenolic resins are for their very nature thermosetting, the presence of phenolic resins as binders requires process temperatures (moulding) not lower than 130° C. to obtain the brake pad.

For such resins indeed the binding action occurs only through hardening which is actually induced by temperature conditions not lower than 130° C. In some cases it is necessary to carry out also a subsequent cross-linking treatment at temperatures not lower than 130° C.

In case of use of a binding composition based on a hydraulic binder, subject-matter of the present invention, the hardening process of the binding part is induced by the presence of water, according to the definition of hydraulic binder, below reported.

Therefore, during the process of production of the brake pad, significantly lower temperatures are used, lower than about 90° C., univocally for accelerating the hardening process of the hydraulic binder to short aging, according to what is known from the prior art on cement-based articles, and making the hardening process compatible with the moulding times of the brake pad production process.

The use of a phenolic resin under moulding conditions with a temperature lower than 90° C. would not lead to the binding action necessary for the formation of the brake pad provided with the desired features.

As known from the prior art, cement-based materials such as mortars/cement pastes, when subjected to thermic treatments higher than 300° C., undergo a progressive loss of the final physical mechanical properties of the product. Indeed, regardless of the type of aging, the performance decrease of the elastic module of a specimen of mortar thermally treated at 300° C., compared with an identical specimen not thermally treated, ranges around 30% with respect to the initial value.

It is apparent that from these assumptions it is fully unexpected and surprising that a binding composition based on a hydraulic binder can be used as binder in friction materials in replacement of thermosetting resins, and mostly that the friction material thus obtained meets the necessary specifications, considering that the braking systems are subjected to high local temperatures (eve >600° C.) under mechanical "shear" (shear stress) conditions.

The friction material for brake pads according to the present invention comprises a binding composition based on a hydraulic binder selected among Portland cement, pozzolana cement or slag cement, said binder being provided with a blaine fineness comprised between 3500 and 9000, more preferably between 4000 and 7000 and still more preferably with a fineness equal to 6500 blaine.

The wording "binding composition based on a hydraulic binder", according to the present invention, means a powder material comprising a hydraulic binder as above indicated and possibly additives and additions of the inorganic type. The wording "hydraulic binder" means a powder material which, mixed with water, hardens by hydration irrespective of the temperature conditions, provided that they are higher than 4° C. (temperature at which water is no longer present in the liquid form, but solid) and that, after hardening, keeps its resistance and stability.

A clinker which can be used for the preparation of a hydraulic binder according to the present invention is a Portland cement clinker, as defined according to the UNI EN 197.1 standard, that is, a hydraulic material composed of at least two-thirds by mass of calcium silicates ($3CaO.SiO_2$) and ($2CaO.SiO_2$), the remaining part being $Al_2O_3$, $Fe_2O_3$ and other oxides.

Still more preferably, the "hydraulic binder" is based on Portland cement of the I 52.5R type and it is provided with a blaine fineness comprised between 3500 and 9000, more preferably between 4000 and 7000 and still more preferably with a fineness equal to 6500 blaine.

The Blaine fineness of cement is measured according to Blaine Method described in standard UNI EN 196-6 part 4; in particular the fineness of the cement is measured as a specific surface by observing the time taken for a fixed quantity of air to flow through a compacted cement bed of specified dimensions and porosity.

Under standardized conditions the specific surface of cement is proportional to $\sqrt{t}$ where t is the time for a given quantity of air to flow through the compacted cement bed.

The method is comparative rather than absolute and therefore a reference sample of known specific surface (NIST Portland cement fineness standard 3774 cm$^2$/g) is required for calibration of the apparatus.

The selection of these particular types of cement allows, indeed, to further increase the thermal stability and mechanical resistance, resulting at the maximum in the case of Portland cement of the I 52.5R type, further grinded up to obtain a fineness of about 6500 blaine.

The binding composition based on a hydraulic binder can also comprise aggregates.

The aggregates, or inerts, also defined as inert aggregates, according to the present invention can comprise:
fine aggregates such as powders and sands, defined in the UNI EN 206 standard, having, according to the present invention, a maximum diameter, $d_{max}$, equal to 40 micron;
not fine aggregates with a $d_{max}$ greater than 40 micron.

The aggregates can be suitably selected from limestone aggregates, quartz or silico-limestone aggregates, with whichever form, or grinded, or spherical, for example marble powders, ceramized and also of the lightened type. As above indicated, the wording "binding composition based on a hydraulic binder", according to the present invention, means a powder material comprising a hydraulic binder and possibly additives and additions of the inorganic type: the composition may thus also comprise one or more auxiliary substances selected among feeds of mining or pozzolana origin, pigments of organic and/or inorganic nature or other. For mining or pozzolana feeds it means microsilica, silica fume, slag, fly ash, metakaolin, natural pozzolans, limestone and natural calcium carbonate. For the purposes of the present invention the binding composition based on a hydraulic binder may contain an agent or a waterproofing or hydrophobic additive. Such agents include a wide range of compounds of organic or organo-siliceous nature, such as for example a mixture of polyvinylalcohol and silane, namely alkyloxysilanes. In addition to the above mentioned components, the binding composition based on a hydraulic binder present in the friction material subject-matter of the present invention, may comprise various other additives to adapt the characteristics of the mixture to specific requirements. Examples of such additives can be super-fluidifiers, preferably of the polycarboxylic type, anti-shrinkage agents, hardening and/or seizing accelerators, rheology or physic-mechanical properties modifiers, such as for example celluloses or lattices, expansive, aerating, deaerating or adhesion agents. Such additives are optional for the purposes of the invention.

The binding composition based on a hydraulic binder may also comprise the addition of fibres of a different nature, such as inorganic fibres as metallic fibres or glass fibres and wollastonite, and organic fibres based on polyvinylalcohol or polypropylene or aramid fibres, selected according to the final application.

The binding composition based on a hydraulic binder is present in a percentage ranging from 5 to 30% by weight with respect to the total weight of the mixture composing the friction material, preferably is present in a percentage varying from 10 to 15% and still more preferably is equal to about 12% by weight with respect to the total weight of the mixture composing the friction material.

The preferred percentage of about 12% by weight with respect to the total weight of the mixture composing the friction material allows to obtain an optimal friction material with respect to the characteristics of mechanical seal in the "shear" process under thermo-oxidative conditions.

For the purposes of the present invention the added water necessary for the hardening process of the hydraulic binder is comprised in a percentage varying from 5 to 20% by weight with respect to the total weight of the mixture composing the friction material, preferably varying from 8 to 15% by weight, more preferably from 10 to 12% by weight.

The friction material according to the present invention is a material which, additional to the binding composition, may comprise fibres, lubricants, abrasives, friction modifiers and/or other additional materials, defined in the present invention through the term "Multi-component mixture".

A friction material according to the present invention, additional to the binding composition based on a hydraulic binder in a percentage varying from 5 to 20% by weight, is provided with a multi-component mixture comprising a lubricant in a percentage varying from 5 to 15% by weight, at least an abrasive in a percentage varying from 8 to 25% by weight, at least a component containing carbon in a percentage varying from 8 to 25% by weight, at least a modifier in a percentage varying from 15 to 30% by weight, all the percentages being computed with respect to the total weight of the composition composing the friction material.

Optionally, the friction material according to the present invention may comprise one or more fibres in a percentage varying from 7 to 30% by weight with respect to the total weight of the composition composing the friction material.

As possible examples of fibres, among which is selected the fibre used in the friction material according to the present invention, it can be indicated fibres based on polyacrylonitrile, PAN, polyaramid, cellulose fibres, metallic fibres.

The fibres in the friction material according to the present invention are preferably steel fibres and aramid fibres.

As possible examples of lubricants, among which is selected the lubricant used in the friction material according to the present invention, it may be indicated organic lubricants and metallic lubricants, metallic sulphides mixtures, as tin sulphides, zinc sulphides, iron sulphides and molybdenum sulphide, boron nitride, tin powder and zinc powder.

The lubricant in the friction material according to the present invention is preferably selected from metallic sulphides.

As possible examples of abrasives, generally classified on the basis of their Mohs hardness, from which is selected the abrasive used in the friction material according to the present invention, it can be indicated mineral fibres, zirconium oxide, zirconia, zirconium silicate, mica, alumina, ceramic fibres; calcium silicates, magnesium, zirconium and/or aluminium; synthetic mineral fibres as hardwool, slagwool and rock wool, silica, silicon dioxide, sand, silicon carbide, iron oxide, chromite iron and magnesium oxide, potassium titanate.

The abrasive in the friction material according to the present invention is preferably selected from metal oxides and other abrasives with a hardness according to the mobs scale greater than 6.

As possible examples of component containing carbon, from which is selected the component used in the friction material according to the present invention, it can be indicated natural graphite, synthetic graphite, petroleum coke, desulfurized petroleum coke and carbon black.

The above mentioned component containing carbon in the friction material according to the present is preferably selected from graphite and coke.

As possible examples of modifiers, from which are selected the modifiers used in the friction material according to the present invention, are mentioned lime, calcium oxide, calcium hydroxide, talc, calcium carbonate, calcium silicate, barite, fluorinated compounds, metallic powders, rubber in form of rubber powder or recycled rubber in pieces and various types of friction powders.

The modifier in the friction material according to the present invention is preferably selected from barite, rubber and metallic powders.

A preferred friction material according to the present invention consists of a binding composition based on the Portland cement type I 52.5R with fineness 6500 Blaine and water and from a multi-component mixture comprising components preferably selected from metallic oxides, steel fibres, aramid fibres, chromite, metallic sulphides, graphite, coke, metallic powders, barite and rubber.

FIG. 1 is a perspective view of an illustrative brake pad, incorporating a friction material according to an embodiment of the present invention.

The several components as above listed form the friction material and, when mixed in the way and in the proportions suggested, provide a family of friction materials presenting performances equal or higher than those of a material containing phenolic resins, in full absence of any type of phenolic resin as binder.

For their complete homogenization, cement, water and the other components constituting the friction material are mixed, in proper proportions, up to obtain a homogeneous mixture free of lumps and with a suitable consistence, which is thus subjected to the moulding process for obtaining brake pads.

The braking mixture thus achieved is, indeed, subjected to a compression moulding process at a temperature ranging from 4 to 90° C. preferably from 40 to 80° C. and at a pressure ranging from 2 to 6 KN/cm$^2$, preferably from 4 to 5 KN/cm$^2$, being these temperature and pressure conditions optimal for moulding of brake pads starting from the friction materials according to the present invention.

After a week of aging in air, the pads are rectified and painted. After about 28 days of aging from moulding, the pads are characterized and tested as indicated below.

The characterization of the pads achieved through the moulding process with the selected formulations is based on the assessment of the following aspects:
A) uniformity and regularity of the outline of the edges and absence of form flaws;
B) compressibility and surface hardness;
C) tribological characteristics of the friction material, determined through the test called "AK Master" and "AMS".

The characterizations A) and B) are achieved through the following test:
A) uniformity and regularity of the outline of the edges and absence of form flaws: it basically deals with an evaluation of the moulding test consisting in the observation of the following parameters: A1) homogeneous filling of the mould with the material, with the consequent achievement of a product free of flaws; A2) observations of possible surface oxidations or anomalous bulges. Such observations are carried out through visual ascertainment and through planarity and parallelism measurement of the product.
B) "compressibility" according to ISO-6310 and "surface hardness" according to JIS D4421; compressibility and surface hardness provide an indication on the homogeneousness of the mechanical properties between edge and internal part of the pad.
C) Tribological characteristics.

The tribological characteristics of the friction material are determined through the test called "SAE J2522" (called "AK Master") and "AMS".

The test named "AK Master" is a test on performance, during which a pair of pads is tested in various braking situations, among which, after a break-in phase, a plurality of braking operations are simulated at different pressures and at low, medium and high speeds, and specific braking, such as cold braking and highway braking.

The test named "AMS" is the test on the behaviour of the braking system at high and repeating stress and simulates extreme situations which the braking systems could undergo. It deals with 10 consecutive braking operations at high pressure from 100 Km/h to 0. With respect to the AK-Master test the same temperatures are reached, but with higher pressures. Through this test the friction and the fluid consumption are measured.

The main advantage of the friction material according to the present invention is that it allows to achieve brake pads, as well as other industrial applications based on said material, which are environment-friendly, not presenting any release of phenols in the environment.

Moreover, the particular features of the binding composition allow to achieve friction materials which ensure performances equal to or higher than those of a material containing phenolic resins, in complete absence of any type of phenolic resin as binder.

Other features and advantages of the invention will appear from the following examples reported with an illustrative and not limitative purpose.

EXAMPLE 1

It has been prepared a friction material (FB41) through the composition reported in the following table 1.

TABLE 1

| FB41 | |
|---|---|
| Binding composition based on Portland Cement type I 52.5 R Calusco (6500 blaine) | 11.79% |
| Multi-component Mixture | 78.05% |
| Water | 10.16% |

Specifically the friction material has been prepared using a binding composition containing a Portland cement type I 52.5R of the cement plant of Calusco, over-grinded up to obtain a fineness of about 6500 blaine. Such a binding composition has been added in a percentage equal to 11.79% by weight with respect to the total weight of the composition constituting the friction material and contains, additional to the cement binder Portland type I 52.5R of the cement plant of Calusco, the waterproofing additive Seal 200 (a mixture of polyvinylalcohol and silane, namely an alkyloxysilane) in a percentage equal to 1.15% by weight, with respect to the total weight of the binding composition.

The multi-component mixture used in the present example consists of:

| | |
|---|---|
| Aluminium and magnesium oxides | 12 |
| Steel Fibres | 27.2 |
| Aramid Fibres | 2.2 |
| Chromite | 4.3 |
| tin and molybdenum sulphides | 7.6 |
| Graphite | 6.5 |
| Coke | 12 |
| Metallic Powders | 17.4 |
| Barite | 8.7 |
| Rubber | 2.2 |

The % of the multi-component mixture are percentages by weight with respect to the total weight of the only multi-component mixture.

The friction material thus achieved has been moulded by compression under temperature and pressure conditions equal to 80° C. and 4.5 KN/cm$^2$, using moulds which led to the achievement of a pad with a surface of 77 cm$^2$, with a thickness equal to 1 cm.

More precisely, the moulds used in the test reported in the present example are moulds providing the achievement of a pad with a surface of 77 cm$^2$, with a thickness equal to 1 cm, which represents the Ferrari F152 back size and Alfa 939 front size.

After a week of aging in the air, the pads have been rectified and painted. Then, after about 28 days of aging from the moulding, the pads have been characterized and tested as indicated below.

The pads obtained from the formulation reported in table 1 have been visually observed and do not present neither surface oxidations, nor anomalous bulges.

It has been next made measurements of the HRR surface hardness of the product thus obtained according to the JIS D4421 standard, obtaining an average value of 91 and also observing a good homogeneousness of the mechanical properties between edge and central part of the pad.

Said aspect is of crucial importance to achieve a friction material which does not present potential detachment points and therefore characterized by a high resistance to wear.

A uniformity and regularity of the outline of the edges and the homogeneousness of the central part of the pad with respect to the edges are therefore key elements for having wear of the pad analogous or improved with respect to the common values of pads using phenolic resins as binders.

The test of "Compressibility" according to ISO-6310 highlighted an average value equal to 40.

The pads, tested according to the test "AK Master" previously described, have shown values in terms of wear and aspect of the discs and of the pads equal to 0.33-0.33 mm (this value refers to the measurement made on the pair of pads), therefore fully surprising, and an average friction coefficient equal to 0.42.

It deals with values of friction coefficient absolutely in line with the required specifications.

Said value is in line with what has been obtained for pads achieved with thermosetting resins.

The pads already tested through the test AK-MASTER have been thus subjected to the test AMS.

With respect to the test AK-Master, the test AMS operates under the same temperatures but with higher pressures, measuring the friction and consumption of the braking fluid.

Also the test according to the test AMS had a positive outcome: the performances obtained in terms of friction coefficient are good also at a high temperature.

The pads, tested according to the test "AMS" have shown values in terms of wear and aspect of the discs and of pads equal to 0.11-0.10 mm (this value refers always to the measurement carried out on the pair of pads).

Also this value is in line with what has been obtained for pads achieved with thermosetting resins.

Wears are quite low and confirm the solidity of the braking pad according to the present invention.

The aspect of the discs and pads is such that it has not been observed any detachment/crack, but only some small inclusions on the face of the disc.

EXAMPLE 2

It has been prepared a friction material (FB42) through the composition reported in the following table 2.

TABLE 2

| FB42 | |
|---|---|
| Binding composition based on Cement type IV/B(P) 32.5R (6000 blaine) | 11.80% |
| Multi-component mixture | 78.05% |
| Water | 10.15% |

The friction material has been prepared using a binding composition containing cement type IV/B(P) 32.5R (6000 blaine). Such a binding composition has been added in a percentage equal to 11.80% by weight with respect to the total weight of the composition constituting the friction material and contains, additional to the cement binder type IV/B(P) 32.5R (6000 blaine), the waterproofing additive Seal 200 (a mixture of polyvinylalcohol and silane, namely an alkyloxysilane) in a percentage equal to 1.15% by weight, with respect to the total weight of the binding composition.

The multi-component mixture used in the present example is the same mixture used into example 1.

Through the same process described for example 1, braking pads starting from the formulation reported in table 2 have been achieved.

Measurements of surface hardness HRR of the product thus obtained were carried out according to the JIS D4421 standard, obtaining an average value of 90 and observing also a good homogeneousness of the mechanical properties between edge and central part of the pad. The test of "Compressibility" according to ISO-6310 highlighted an average value equal to 40.

The pads, tested according to the test "AK Master" previously described, have shown values in terms of wear and aspect of the discs and of pads equal to 0.29-0.40 mm (this value refers to the measurement carried out on the pair of pads), therefore fully surprising, and an average friction coefficient equal to 0.41.

The pads, tested according to the test "AMS" have shown values in terms of wear and aspect of the discs and of pads equal to 0.10-0.08 mm (this value refers to the measurement carried out on the pair of pads).

EXAMPLE 3

It has been prepared a friction material (FB45) through the composition reported in the following table 3.

TABLE 3

| FB45 | |
|---|---|
| Binding composition based Portland slag cement II B-S 42.5N (4200 Blaine) | 11.80% |
| Multi-component mixture | 78.05% |
| Water | 10.15% |

The friction material has been prepared using a binding composition containing Portland slag cement II B-S 42.5N (4200 Blaine). Such a binding composition has been added in a percentage equal to 11.80% by weight with respect to the total weight of the composition constituting the friction material and contains, additional to the cement binder type IV/B(P) 32,5R (4200 blaine), the waterproofing additive Seal 200 (a mixture of polyvinylalcohol and silane, namely an alckyloxysilane) in a percentage equal to 1.15% by weight, with respect to the total weight of the binding composition.

The multi-component mixture used in the present example is the same mixture used into example 1.

Through the same process described for example 1 it has been thus achieved brake pads starting from the formulation reported in table 3.

Measurements of surface hardness HRR of the product thus obtained according to the JIS D4421 standard have been carried out, obtaining an average value equal to 91 and observing also a good homogeneousness of the mechanical properties between edge and central part of the pad. The test of "Compressibility" according to ISO-6310 have shown an average value equal to 38.

The pads, tested according to the test "AK Master" previously described, have shown values in terms of wear and aspect of the discs and of the pads equal to 0.34-0.30 mm (this value refers to the measurement carried out on a pair of pads), therefore fully surprising, and an average friction coefficient equal to 0.40.

The pads, tested according to the test "AMS" have shown values in terms of wear and aspect of the discs and of the pads equal to 0.08-0.08 mm (this value refers to the measurement carried out on the pair of pads).

FIGS. 2A, 2B and 2C and FIGS. 3A, 3B, 3C and 3D illustrate brake rotors and pads after being subjected to test AK Master and AMS: more precisely, the photographs illustrate a referenced prior art brake pad and corresponding rotor after testing of the prior art brake pad with resin without cement (FIGS. 2A, 2B and 2C) and the brake pad and corresponding rotor after testing of brake pad FB45 (FIGS. 3A, 3B, 3C and 3D).

EXAMPLE 4

Calcareous Cement

It has been prepared a friction material through the composition reported in the following table 4.

TABLE 4

| | |
|---|---|
| Binding composition based on cement CEM II/A-LL 42.5 R Calusco (3800 Blaine) | 12% |
| Multi-component mixture | 82% |
| Water | 6% |

The friction material has been prepared using a binding composition containing cement CEM II/A-LL 42.5 R Calusco (3800 Blaine). Such a binding composition has been added in a percentage equal to 12% by weight with respect to the total weight of the composition constituting the friction material.

The multi-component mixture used in the present example is the same mixture used into example 1.

Through the same process described for example 1 it has been thus achieved brake pads starting from the formulation reported in table 4.

Measurements of surface hardness HRR of the product thus obtained according to the JIS D4421 standard have been carried out, obtaining an average value equal to 90 and observing also a good homogeneousness of the mechanical properties between edge and central part of the pad. The test of "Compressibility" according to ISO-6310 have shown an average value equal to 40.

The pads, tested according to the test "AK Master" previously described, have shown values in terms of wear and aspect of the discs and of the pads equal to 0.33-0.35 mm (this value refers to the measurement carried out on a pair of pads), therefore fully surprising, and an average friction coefficient equal to 0.40.

The pads, tested according to the test "AMS" have shown values in terms of wear and aspect of the discs and of the pads equal to 0.07-0.09 mm (this value refers to the measurement carried out on the pair of pads).

EXAMPLE 5

Cement Type I and Slag

It has been prepared a friction material through the composition reported in the following table 5.

TABLE 5

| | |
|---|---|
| Binding composition based on Portland cement type I 52.5 R Calusco (6500 Blaine) (6.11%) + slag (4000 blaine) (6.11%) and waterproofing additive Seal 200 (0.28%) | 12.5% |
| Multi-component mixture | 82% |
| Water | 5.5% |

The friction material has been prepared using a binding composition containing Portland cement type I 52.5 R Calusco (6500 Blaine), blast furnace slag (4000 Blaine) and waterproofing additive Seal 200, in a percentage equal to 12.5% by weight with respect to the total weight of the composition constituting the friction material The multi-component mixture used in the present example is the same mixture used into example 1.

Through the same process described for example 1 it has been thus achieved brake pads starting from the formulation reported in table 5.

Measurements of surface hardness HRR of the product thus obtained according to the JIS D4421 standard have been carried out, obtaining an average value equal to 90 and observing also a good homogeneousness of the mechanical properties between edge and central part of the pad. The test of "Compressibility" according to ISO-6310 have shown an average value equal to 41.

The pads, tested according to the test "AK Master" previously described, have shown values in terms of wear and aspect of the discs and of the pads equal to 0.30-0.32 mm (this value refers to the measurement carried out on a pair of pads), therefore fully surprising, and an average friction coefficient equal to 0.39.

The pads, tested according to the test "AMS" have shown values in terms of wear and aspect of the discs and of the pads equal to 0.08-0.09 mm (this value refers to the measurement carried out on the pair of pads).

EXAMPLE 6

Cement Type I and Metakaolin

It has been prepared a friction material through the composition reported in the following table 6.

TABLE 6

| | |
|---|---|
| Binding composition based on Portland cement type I 52.5 R Calusco (6500 Blaine) (7.32%) + metakaolin (4.90%) | 12.5% |

TABLE 6-continued

| | |
|---|---|
| and waterproofing additive Seal 200 (0.28%) | |
| Multi-component mixture | 82% |
| Water | 5.5% |

The friction material has been prepared using a binding composition containing Portland cement type I 52.5 R Calusco (6500 Blaine), metakaolin (Metastar 501-Imerys) and waterproofing additive Seal 200, in a percentage equal to 12.5% by weight with respect to the total weight of the composition constituting the friction material.

The multi-component mixture used in the present example is the same mixture used into example 1.

Through the same process described for example 1 it has been thus achieved brake pads starting from the formulation reported in table 6.

Measurements of surface hardness HRR of the product thus obtained according to the JIS D4421 standard have been carried out, obtaining an average value equal to 90 and observing also a good homogeneousness of the mechanical properties between edge and central part of the pad.

The test of "Compressibility" according to ISO-6310 have shown an average value equal to 40.

The pads, tested according to the test "AK Master" previously described, have shown values in terms of wear and aspect of the discs and of the pads equal to 0.35-0.34 mm (this value refers to the measurement carried out on a pair of pads), therefore fully surprising, and an average friction coefficient equal to 0.38.

The pads, tested according to the test "AMS" have shown values in terms of wear and aspect of the discs and of the pads equal to 0.10-0.11 mm (this value refers to the measurement carried out on the pair of pads).

EXAMPLE 7

Cement Type I and Flying Ashes

It has been prepared a friction material through the composition reported in the following table 7.

TABLE 7

| | |
|---|---|
| Binding composition based on Portland cement type I 52.5 R Calusco (6500 Blaine) (7.32%) + Flying ashes (4.9%) and waterproofing additive Seal 200 (0.28%) | 12.5% |
| Multi-component mixture | 82% |
| Water | 5.5% |

The friction material has been prepared using a binding composition containing Portland cement type I 52.5 R Calusco (6500 Blaine), flying ashes and waterproofing additive Seal 200, in a percentage equal to 12.5% by weight with respect to the total weight of the composition constituting the friction material The multi-component mixture used in the present example is the same mixture used into example 1.

Through the same process described for example 1 it has been thus achieved brake pads starting from the formulation reported in table 7.

Measurements of surface hardness HRR of the product thus obtained according to the JIS D4421 standard have been carried out, obtaining an average value equal to 90 and observing also a good homogeneousness of the mechanical properties between edge and central part of the pad. The test of "Compressibility" according to ISO-6310 have shown an average value equal to 42.

The pads, tested according to the test "AK Master" previously described, have shown values in terms of wear and aspect of the discs and of the pads equal to 0.32-0.34 mm (this value refers to the measurement carried out on a pair of pads), therefore fully surprising, and an average friction coefficient equal to 0.36.

The pads, tested according to the test "AMS" have shown values in terms of wear and aspect of the discs and of the pads equal to 0.09-0.11 mm (this value refers to the measurement carried out on the pair of pads).

The invention claimed is:

1. A friction material for brake pads comprising a binding composition comprising Portland cement type I 52.5R with a Blaine fineness of 6500 cm$^2$/g, water and a multi-component mixture comprising components including a lubricant, an abrasive, a component containing carbon, and a modifier, said components selected from metallic oxides, steel fibres, aramid fibres, chromite, metallic sulphides, graphite, coke, metallic powders, barite and rubber, the binding composition being present in a percentage ranging from 5 to 30% by weight with respect to the total weight of a mixture constituting the friction material.

2. The friction material according to claim 1, wherein the binding composition is present in a percentage ranging from 10 to 15% by weight with respect to the total weight of the mixture.

3. The friction material of claim 1, wherein the binding composition is present in a percentage ranging of about 12% by weight with respect to the total weight of the mixture.

4. The friction material according to claim 1, wherein the multi-component mixture further comprises one or more fibres in a percentage ranging from 7 to 30% by weight with respect to the total weight of the composition constituting the friction material.

5. Brake pads comprising a friction material according to claim 1 and a base of metallic support.

6. A friction material for brake pads comprising a binding composition comprising Portland cement type I 52.5R with a Blaine fineness of 6500 cm$^2$/g in a percentage ranging from 5 to 30% by weight, water in a percentage ranging from 5 to 20% by weight, and a multi-component mixture comprising a lubricant in a percentage ranging from 5 to 15% by weight, an abrasive in a percentage ranging from 8 to 25% by weight, a component containing carbon in a percentage ranging from 8 to 25% by weight, and a modifier in a percentage ranging from 15 to 30% by weight, all the percentages being computed with respect to the total weight of the composition constituting the friction material.

7. The friction material according to claim 6, wherein the multi- component mixture further comprises one or more fibres in a percentage ranging from 7 to 30% by weight with respect to the total weight of the composition constituting the friction material.

8. The friction material of claim 6 wherein the multi-component mixture further comprises one or more components selected from metallic oxides, steel fibres, aramid fibres, chromite, metallic sulphides, graphite, coke, metallic powders, barite and rubber.

9. A method of using a binding composition for the achievement of a friction material for brake pads, the binding composition comprising Portland cement type I 52.5R with a Blaine fineness of 6500 cm$^2$/g, comprising the step of mixing the binding composition with water and a multi-component mixture comprising components including a lubricant, an abrasive, a component containing carbon, and a modifier, said components selected from metallic oxides, steel fibres, aramid fibres, chromite, metallic sulphides, graphite, coke, metallic powders, barite and rubber, where the binding composition is present in a percentage ranging from 5 to 30% by weight with respect to the total weight of a mixture constituting the friction material.

* * * * *